United States Patent
Liu et al.

(10) Patent No.: US 8,249,613 B2
(45) Date of Patent: Aug. 21, 2012

(54) METHOD AND APPARATUS OF DATA PROCESSING IN MIMO SYSTEM

(75) Inventors: Jingxiu Liu, Beijing (CN); Xiaoming She, Beijing (CN); Lan Chen, Beijing (CN); Hidekazu Taoka, Kanagawa-ken (JP)

(73) Assignee: NTT DoCoMo Inc., Tokyo (JP)

( * ) Notice: Subject to any disclaimer, the term of this patent is extended or adjusted under 35 U.S.C. 154(b) by 1027 days.

(21) Appl. No.: 12/187,087

(22) Filed: Aug. 6, 2008

(65) Prior Publication Data
US 2009/0052571 A1    Feb. 26, 2009

(30) Foreign Application Priority Data
Aug. 23, 2007   (CN) .......................... 2007 1 0146147

(51) Int. Cl.
*H04W 72/00* (2009.01)
(52) U.S. Cl. ..................................... 455/452.2; 455/450
(58) Field of Classification Search ............... 455/452.2, 455/450–452.1, 453, 445; 370/329, 335, 370/342
See application file for complete search history.

(56) References Cited

U.S. PATENT DOCUMENTS

| | | | | |
|---|---|---|---|---|
| 7,865,153 | B2 * | 1/2011 | Khan et al. | 455/101 |
| 7,944,985 | B2 * | 5/2011 | ElGamal et al. | 375/267 |
| 7,945,214 | B2 * | 5/2011 | Kim et al. | 455/69 |
| 2006/0193245 | A1 * | 8/2006 | Aghvami et al. | 370/208 |
| 2008/0080637 | A1 * | 4/2008 | Khan et al. | 375/267 |

* cited by examiner

*Primary Examiner* — Brandon Miller
(74) *Attorney, Agent, or Firm* — Blakely, Sokoloff, Taylor & Zafman LLP

(57) ABSTRACT

A method of data processing includes the steps of: dividing user terminals into groups based on channel attributes and service requirements of the user terminals and setting a precoding code word and a cyclic delay for each of the groups; and determining which group a user terminal corresponding to the data to be processed belongs to and processing the data to be processed by the Cyclic Delay Diversity (CDD) precoding based on the precoding code word and the cyclic delay of the group. A data processing apparatus includes a grouping module and a CDD preceding module. By the method and apparatus above, the signal quality in the MIMO system can be improved.

20 Claims, 4 Drawing Sheets

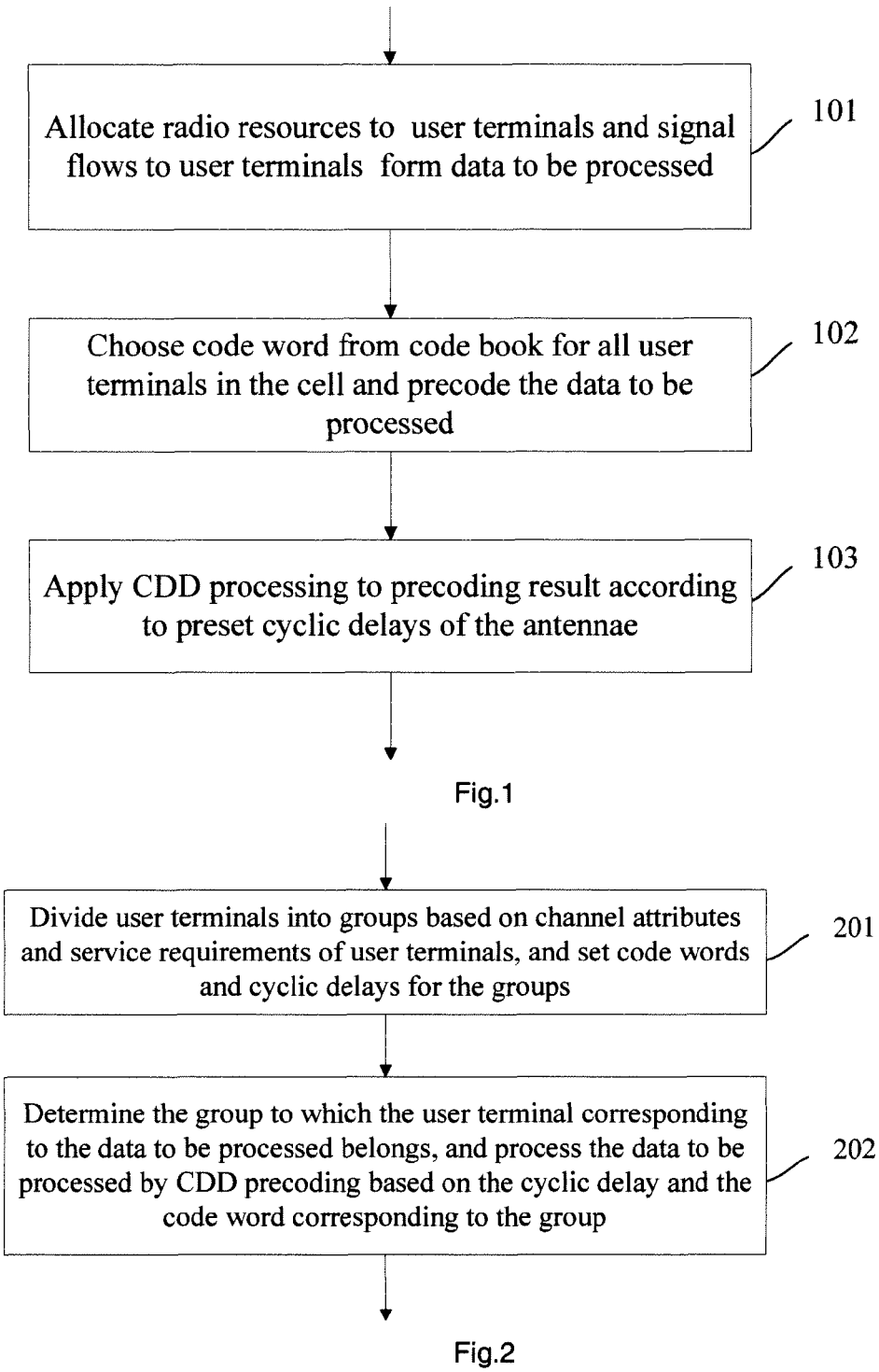

US 8,249,613 B2

METHOD AND APPARATUS OF DATA PROCESSING IN MIMO SYSTEM

PRIORITY

The present application claims priority to and incorporates by reference the entire contents of Chinese patent application, No. 200710146147.1, filed in China on Aug. 23, 2007.

FIELD OF THE TECHNOLOGY

The present invention relates to Multiple Input Multiple Output (MIMO) technology, and more particularly, to a method and apparatus of data processing in a MIMO system.

BACKGROUND OF THE INVENTION

The core idea of MIMO technology is that multiple antennae are used to transmit and receive multiple signals in order to fully utilize space resources. With respect to narrowband channels, the channel capacity of a MIMO system is nearly in direct proportion to the minimum number of receiving and transmitting antennae, and the channel capacity and spectrum utilization rate can thus be increased dramatically without increasing transmission power of the antennae and spectrum resources.

The Orthogonal Frequency Division Multiplexing (OFDM) technology is a multi-carrier transmission technology, which divides a channel into multiple orthogonal sub channels, converts high-speed data stream into parallel low-speed sub streams and modulates the parallel low-speed sub streams to be transmitted on the sub channels. The typical advantages of an OFDM system include low InterChannel Interference (ICI) among the sub channels, high utilization rate of spectrum resources and relatively strong resistance to both frequency-selective fading and intersymbol interference.

In order to fully exploit the advantages of MIMO technology and OFDM technology, the space resources are properly utilized based on the OFDM technology by combining the MIMO and OFDM technologies to form a MIMO-OFDM system. In the MIMO-OFDM system, higher data transmission rate can be achieved while the Quality of Service (QoS) is guaranteed.

Cyclic delay is usually introduced into the data to be processed in the MIMO-OFDM system to obtain the performance of frequency-selective on flat channels. In other words, the data to be transmitted via different antennae correspond to different cyclic delays to obtain Cyclic Delay Diversity (CDD). Introducing cyclic delays is called CDD processing. Furthermore, in order to improve the signal transmission quality in the MIMO-OFDM system, the data to be processed is usually pre-coded by using a preset code book, i.e. by multiplying the data to be processed by the code word that matches the current channel most in the code book. The CDD processing and the precoding are often combined into a CDD preceding technique to relieve the problem of performance deterioration of multi-user scheduling on flat channels and thus improve signal quality.

FIG. 1 is a flow chart in which data are processed by using a conventional CDD precoding technique on the base station side. As shown in FIG. 1, the method of processing the data, e.g. on the downlink, is described below.

In Block 101, radio resources are allocated to user terminals and the signal flow to the user terminals forms the data to be processed.

Because the data to be processed is on the downlink, the base station allocates the radio resources to the user terminals in the MIMO-OFDM system in order to ensure normal data transmission of multiple users. Furthermore, because the base station needs to communicate with multiple users on the downlink, the signal flows corresponding to different user terminals respectively are combined to form the data to be processed. For example, the signal flow corresponding to one user is put into one row of a matrix of the data to be processed.

In Block 102, a code word corresponding to the user terminals in the cell is chosen from a preset code book to precode the data to be processed.

The same code book which includes a plurality of code words for preceding is respectively set in the base station and the terminals in the MIMO-OFDM system. A terminal measures and determines the current channel quality, chooses a code word that best matches the determined channel response from the code book and reports the index of the chosen code word to the base station. Upon receiving the code word index from the terminal, the base station finds the code word corresponding to the code word index in the code book and sets the found code word as the code word corresponding to all user terminals in the cell where the reporting terminal is located. After the code word corresponding to all user terminals in the cell is determined for the data to be processed, the signal flows of the user terminals among the data to be processed are multiplied by the found code word to obtain a precoding result.

In Block 103, the precoding result is processed by the CDD processing based on preset cyclic delays of the antennae.

Generally, the OFDM chip serves as the basic unit of the cyclic delays of the antennae, and the cyclic delays are varying slowly over the long term. For example, in a two-input-two-output MIMO-OFDM system, both the transmitting antenna 1 and transmitting antenna 2 would transmit signals $[S_1, S_2, \ldots S_N]$, and the transmission of $S_1$ is earlier than that of $S_N$. If the cyclic delay corresponding to transmitting antenna 1 is −1 OFDM chip and the cyclic delay corresponding to transmitting antenna 2 is 2 OFDM chips, the signals transmitted by the transmitting antenna 1 is $S_N \to S_1 \to \ldots S_{N-2} \to S_{N-1}$ in chronological order, and the signals transmitted by the transmitting antenna 2 is $S_3 \to \ldots \to S_N \to S_1 \to S_2$ in chronological order. As can be seen, the CDD processing applied to the signals actually means that n symbols chronologically behind in the sequence are transmitted early in the sequence if the cyclic delay is smaller than 0, and n symbols chronologically ahead in the sequence are transmitted later if the cyclic delay is greater than 0, where n is the absolute value of a cyclic delay.

The Blocks 102 and 103 can be combined into one Block, in which the CDD precoding is realized by multiplying the signals to be transmitted by the code word of CDD precoding. The code word of CDD precoding can be expressed as $W_{CDD}(k) = \text{diag}(e^{-j2\pi k d_1/N_C}, e^{-j2\pi k d_2/N_C}, \ldots, e^{-j2\pi k d_N/N_C}) W_{Conventional}$, where $W_{CDD}(k)$ indicates the code word of CDD preceding, $W_{conventional}$ indicates conventional code word of preceding, and the diagonal matrix $(e^{-j2\pi k d_1/N_C}, e^{-j2\pi k d_2/N_C})$ is used for the CDD processing, k indicates the serial number of a sub-carrier, Nc indicates the number of sub-carriers and $d_i$ indicates the cyclic delay of No.i antenna.

Thus, the conventional process of data processing is terminated.

After the above process, Serial/Parallel (S/P) transform, Inverse Fast Fourier Transform (IFFT), the insertion of cyclic prefix and the like can be applied to the CDD processing result to obtain the signals to be transmitted and then transmit the signals over corresponding antennae.

As can be seen from the above data processing, the user terminals in the same cell use the same precoding code word, i.e. use the same $W_{Conventional}$. However, there may be user terminals of different demands in one cell, and these user terminals may have different requirements for a precoding code word which reflects the channel response. However, one code word can satisfy only the user terminals of one certain requirement, and would affect the signal transmission quality of other user terminals. For example, a code word which can achieve low bit error rate would not satisfy the user terminals requiring high frequency spectrum. Moreover, the existing cyclic delay varies only slowly in a long term, and the existing cyclic delay is therefore unable to fit the channel variation speed of the user terminals moving at a higher speed in the cell. As a result, the signal transmission quality of the user terminals moving at a high speed cannot be guaranteed. It can thus be concluded that the conventional method of data processing does not support choosing a CDD precoding code word according to different requirements of user terminals and thus can not satisfy the demands of all user terminals, therefore affecting the signal quality in the MIMO system.

SUMMARY OF THE INVENTION

A method and apparatus of data processing in MIMO system are described. In one embodiment, the method comprises dividing user terminals into groups based on channel attributes and service requirements of the user terminals; setting a precoding code word and a cyclic delay for each of the groups; determining which group a user terminal corresponding to data to be processed belongs to; and processing the data to be processed by Cyclic Delay Diversity (CDD) precoding based on the precoding code word and the cyclic delay which correspond to the group which the user terminal belongs to.

BRIEF DESCRIPTION OF THE DRAWINGS

The embodiments of the present invention are hereinafter described in detail with reference to the accompanying drawings in order to make the characteristics and merits of the present invention more apparent for those skilled in the art. In the accompanying drawings:

FIG. 1 is a flow chart illustrating a conventional method of data processing;

FIG. 2 is a flow chart illustrating a method of data processing in accordance with an embodiment of the present invention;

DETAILED DESCRIPTION OF THE INVENTION

Figures 3, 4:
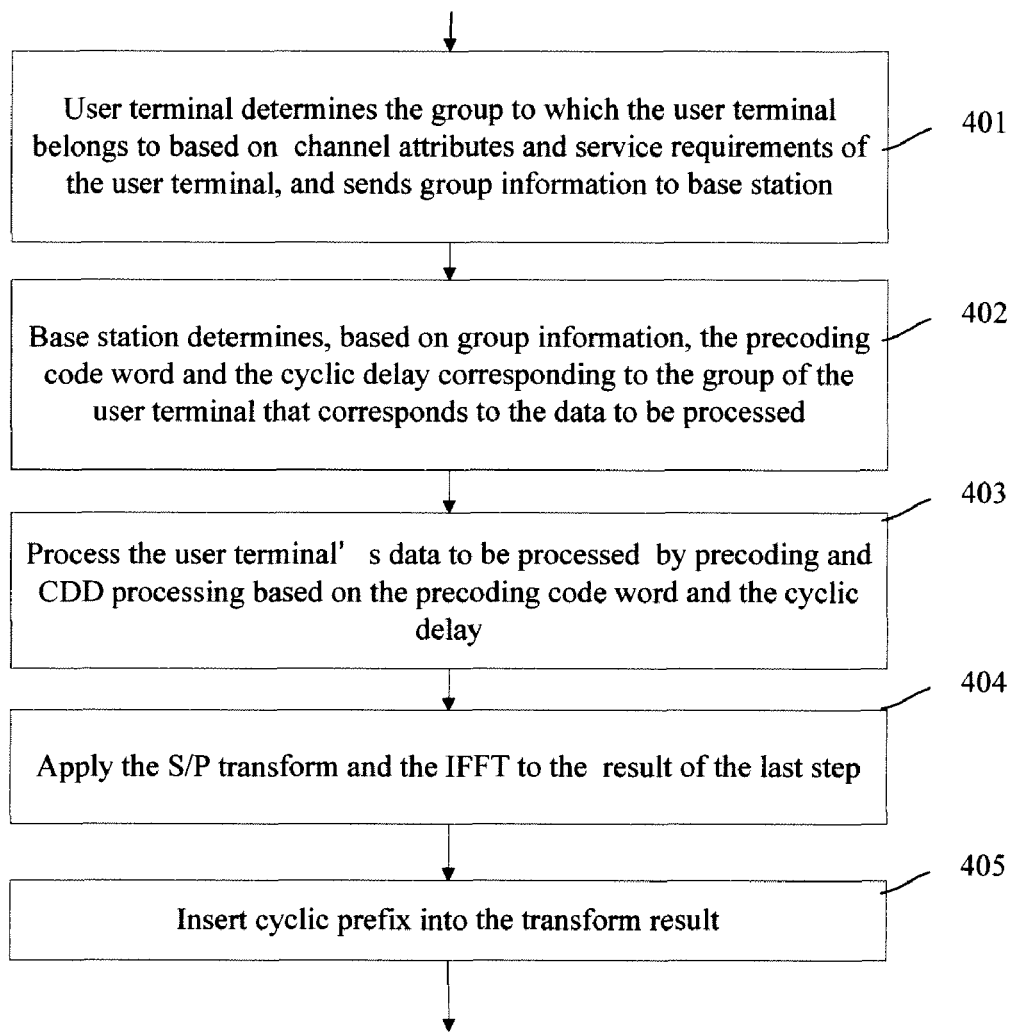
FIG. 3 is a schematic diagram of a data processing apparatus in accordance with an embodiment of the present invention.
FIG. 4 is a flow chart illustrating a method of data processing in accordance with Embodiment 1 of the present invention.

Embodiments of the present invention include a method of data processing to improve the signal quality in a MIMO system. According to an embodiment of the present invention, a method of data processing includes: dividing user terminals into groups based on channel attributes and service requirements of the user terminals; setting a precoding code word and a cyclic delay for each of the groups; determining to which group a user terminal corresponding to data to be processed belongs to; and processing the data to be processed by Cyclic Delay Diversity (CDD) preceding based on the precoding code word and the cyclic delay which correspond to the group which the user terminal belongs to.

According to an embodiment of the present invention, a data processing apparatus is provided to improve the signal quality in a MMO system. The data processing apparatus includes a processor, a grouping module, and a CDD precoding module. The grouping module divides user terminals into groups based on the channel attributes and service requirements of the user terminals, sets a preceding code word and cyclic delay for each of the groups, determines which group a user terminal corresponding to the data to be processed belongs to and sends the precoding code word and the cyclic delay of the group to the CDD precoding module; and the CDD preceding module processes the data to be processed by CDD preceding based on the received precoding code word and cyclic delay.

By applying the present invention, the signal quality in the MIMO system can be improved. Specifically, the present invention has the following advantage: Since the user terminals are divided into different groups according to the channel attributes and the service requirements of the user terminals and a preceding code word and a cyclic delay are set for each of the groups to fit all user terminals in a group, the precoding code word and the cyclic delay adopted will fit the channel attributes and service requirements of a user terminal better and the signal quality will be improved significantly by applying embodiments of the present invention instead of the conventional method of data processing.

In order to make the objective and the technical solution of the present invention more apparent, a detailed description of the present invention is given hereinafter with reference to the accompanying drawings and embodiments.

According to an embodiment of the present invention, a method of data processing in a MIMO system includes: dividing user terminals into groups according to channel attributes and service requirements of the user terminals, where all user terminals in one group correspond to the same precoding code word and the same cyclic delay.

FIG. 2 is a flow chart illustrating a method of data processing in accordance with an embodiment of the present invention. As shown in FIG. 2, the method is described below.

In Block 201, user terminals are divided into groups according to the channel attributes and service requirements of the user terminals and a precoding code word and a cyclic delay are set for each of the groups.

In Block 202, the group to which a user terminal corresponding to the data to be processed belongs is determined and the data to be processed are processed by Cyclic Delay Diversity (CDD) precoding based on the precoding code word and cyclic delay of the group determined.

In the above processing, the user terminals are divided into different groups according to the channel attributes and service requirements of the user terminals and each of the groups has a precoding code word and a cyclic delay which fit all user terminals in the group. Therefore, when the data on the uplink or downlink are processed, the precoding code word and cyclic delay adopted can fit the channel attributes and service requirements of the user terminals better, and the signal quality is improved significantly by applying the method of the present invention instead of the conventional method of data processing.

It should be noted that the channel attributes include the speed of movement of a user terminal and the location of the user terminal and whether the line-of-sight propagation path exists between the user terminal and the base station; and the service requirements include the working mode, bit error rate, spectrum utilization rate and data rate, etc. Moreover, both the preceding code word and the cyclic delay can belong to long-time feedback type or instant feedback type. The cyclic delay of long-time feedback type is suitable for user terminals which move at high speed and/or are on the edge of the cell, such as a cyclic delay of $(N_C/N_t \times I)$ OFDM chips, in which $N_C$ indicates the number of sub-carriers, $N_t$ indicates the number of transmitting antennae and I indicates the indexes of the antennae. The cyclic delay of instant feedback type, such as a cyclic delay of +/− 1, +/− 2 or +/− 3 OFDM chip(s), is suitable for user terminals which move at low speed, or are in the center of the cell, or have the line-of-sight propagation path from the base station. Furthermore, zero cyclic delay is suitable for user terminals which have no line-of-sight propagation path from the base station.

FIG. 3 is a schematic diagram of a data processing apparatus in accordance with an embodiment of the present invention. As shown in FIG. 3, the data processing apparatus includes: a grouping module and a CDD precoding module. The grouping module divides user terminals into groups according to the channel attributes and service requirements of the user terminals, sets a precoding code word and cyclic delay for each of the groups, determines to which group the user terminal corresponding to the data to be processed belongs and sends the precoding code word and cyclic delay of the group to the CDD precoding module. The CDD precoding module processes the data to be processed by the CDD precoding based on the precoding code word and cyclic delay received from the grouping module.

The method of data processing above is described in detail in embodiments of the present invention below.

Embodiment 1

In this embodiment, the data on the downlink are processed and the CDD precoding is carried out in the base station. FIG. 4 is a flow chart illustrating a method of data processing in accordance with Embodiment 1 of the present invention. Referring to FIG. 4, the method is described below.

In Block 401, a user terminal determines to which group it belongs according to its own channel attributes and service requirements, and sends the group identifier to the base station of the cell where the user terminal is located.

In order to make sure that every user terminal has a suitable cyclic delay and precoding code word, groups can be set in advance in the base station and the user terminals in this embodiment, such as high-speed moving group in the center of the cell, low-speed moving group in the center of the cell, high-speed moving group on the edge of the cell and low-speed moving group on the edge of the cell. The groups set in advance are saved in both the base station and the user terminals. After groups of different types of user terminals are set, the base station further chooses suitable preceding code words and cyclic delays for the groups, e.g. it chooses a cyclic delay of long-time feedback type and a precoding code word of long-time feedback type for the high-speed moving group in the center of the cell. The base station may also create a CDD precoding parameter table for convenience of searching, and the table records the relations of the groups to the preceding code words and cyclic delays.

In this Block, the user terminal may determine the attributes of the channel which the user terminal is currently on by measuring attribute parameters. For instance, the channel attributes include high/low movement speed, user location in the center/on the edge of the cell, Multi-User(MU)-MIMO/Single-User(SU)-MIMO mode and whether the user terminal has a line-of-sight propagation path from the base station. The current service requirements, e.g. requirements for low bit error rate or high data rate, can also be determined according to the measured attribute parameters. After the channel attributes and service requirements are determined, the group to which the user terminal belongs can be determined and the group identifier can be sent to the base station on the uplink so that the base station may process the data subsequently based on the group identifier.

In Block 402, the base station determines, based on the group identifier, the preceding code word and cyclic delay corresponding to the group of the user terminal related to the data to be processed.

In this Block, the base station searches the preset CDD precoding parameter table upon receiving the group identifier, and finds the precoding code word and cyclic delay corresponding to the group of the user terminal sending the group identifier.

In the above two Blocks, the user terminal actively determines the group to which the user terminal belongs, which is referred to as a first manner in this disclosure. In this embodiment, it may also be the base station that determines the group to which the user terminal belongs, which is referred to as a second manner in this disclosure. In the second manner, groups and CDD precoding parameter table are set in advance only in the base station. A user terminal can measure its own attribute parameters (e.g. statistic attributes of the channel and movement speed) regularly or upon receiving a notice from the base station, and sends the attribute parameters to the base station. The base station determines the channel attributes and service requirements of the user terminal according to the attribute parameters received from the user terminal, assigns the user terminal to a group according to the channel attributes and the service requirements, and determines the preceding code word and cyclic delay corresponding to the group of the user terminal according to the CDD precoding parameter table. As can be seen, less information needs to be transmitted in the first manner than the second manner, while the user terminal needs to perform the operations of determining the group. In practical applications, either of the two manners can be used to implement block 401 and block 402.

In addition, the MIMO-OFDM system in which there are multiple input and multiple output at the same time is taken as an example in this embodiment, therefore the cyclic delays and precoding code words corresponding to the user terminals may be determined after the groups of all user terminals related to the data to be processed are determined; alternatively, the cyclic delay and precoding code word corresponding to a user terminal may be determined intermediately after the group of the user terminal is determined.

In this embodiment, the radio resources can also be allocated after the groups of the user terminals are determined, and real-time resource allocation is applied to user terminals that move at low speed while long-time resource allocation is applied to user terminals that move at high speed.

In Block 403, the user terminal's data to be processed is processed by precoding and CDD processing based on the precoding code word and the cyclic delay which are determined by the base station.

In this Block, the user terminal's data to be processed are precoded with the precoding code word by multiplying the data to be processed by the precoding code word; and then the CDD processing based on the cyclic delay is applied to the preceding result.

In Blocks 404-405, the S/P transform and IFFT transform are applied to the processing result of Block 404 and the cyclic prefix is inserted into the transform result.

After Blocks 404-405, the data to be processed have been transformed from frequency-domain signals into time-domain signals and have the cyclic prefix that facilitates detection. The S/P transform and IFFT transform can be applied to the data before the CDD processing in Block 403, and the signals processed by the CDD processing are time-domain signals.

Now the data processing in this embodiment is completed.

This embodiment deals with the data on the downlink, and therefore if the data processing is completed, the base station distributes the processed data to the transmitting antennae and transmits the processed data to corresponding user terminal(s), thus the downlink data transmission in the MIMO-OFDM system is completed.

Figure 5:
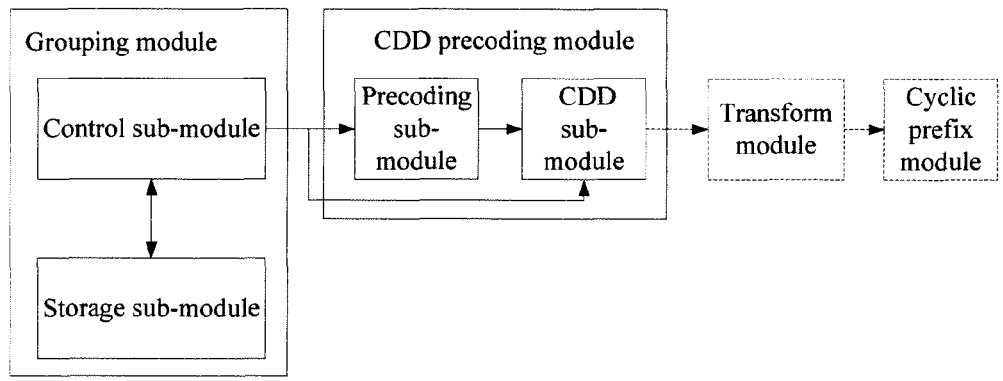
FIG. 5 is a schematic diagram of the structure of a data processing apparatus in accordance with Embodiment 1 of the present invention.

FIG. 5 is a schematic diagram of the structure of a data processing apparatus in accordance with Embodiment 1 of the present invention. The data processing apparatus in FIG. 5 further specifies the grouping module and the preceding module in FIG. 2. As shown in FIG. 5, the data processing apparatus in this embodiment includes a grouping module and a precoding module. The grouping module includes a control sub-module and a storage sub-module; and the CDD precoding module includes a preceding sub-module and a CDD processing sub-module. Optionally, the data processing apparatus in this embodiment may further include a transform module, shown with dotted lines in FIG. 5, and a cyclic prefix module, also shown with dotted lines in FIG. 5. If the data to be processed in this embodiment is on the downlink, the data processing module is located in the base station.

In particular, the control sub-module in the grouping module is adapted to divide user terminals into groups according to the channel attributes and service requirements of the user terminals, determine precoding code words and cyclic delays corresponding to the groups and send to the storage sub-module the group identifiers and the relations of the groups to the precoding code words as well as the cyclic delays. The control sub-module is further adapted to receive, from outside of the grouping module, the group identifier of the user terminal corresponding to the data to be processed; determine the group to which the user terminal belongs, obtain the precoding code word and the cyclic delay corresponding to the group from the storage sub-module and send the precoding code word and the cyclic delay to the CDD precoding module. The storage sub-module in the grouping module is adapted to receive from the control sub-module the group identifiers and the relations of the groups to the precoding code words as well as the cyclic delays, and store such information. The storage sub-module in the grouping module is further adapted to provide the control sub-module with the precoding code word and the cyclic delay corresponding to the group of the user terminal corresponding to the data to be processed.

The preceding sub-module in the CDD precoding module is adapted to receive the data to be processed from outside and the precoding code word from the grouping module, precode the data to be processed based on the preceding code word and send the precoding result to the CDD processing sub-module. The CDD processing sub-module in the CDD precoding module is adapted to receive the cyclic delay from the grouping module and the precoding result from the precoding sub-module and apply the CDD processing to the precoding result using the received cyclic delay.

If the data processing apparatus further includes the transform module and the cyclic prefix module, the CDD processing sub-module is further adapted to send the result of the CDD precoding to the transform module. The transform module applies the S/P transform and IFFT transform to the received result of the CDD precoding and sends the transform result to the cyclic prefix module. The cyclic prefix module adds a cyclic prefix to the received transform result and obtains the data to be transmitted. Alternatively, it can also be the precoding sub-module that sends the preceding result to the transform module, in such a case, the transform module applies the S/P transform and the IFFT transform to the received data and sends the transform result to the CDD processing sub-module.

If it is the base station that determines which group the user terminal belongs to, the control sub-module does not receive from outside of the grouping module the group information of the user terminal corresponding to the data to be processed or determine the group to which the user terminal belongs; instead, the control sub-module receives from outside of the grouping module the attribute parameters of the user terminal corresponding to the data to be processed, determines the channel attributes and service requirements of the user terminal according to the received attribute parameters, and eventually determines the group to which the user terminal belongs. Operations of the other sub-modules are always the same regardless of whether the base station or the user terminal that determines to which group the user terminal belongs.

In this embodiment, user terminals are divided into groups during the data processing, and the user terminals having signals to be transmitted are given precoding code words and cyclic delays which fit the channel attributes and service requirements of the user terminals. Therefore, the demands of the user terminals can be fully satisfied during the data interaction between the base station and the user terminals, and the signal quality can be thus improved. Furthermore, because of the improvement of the signal quality, the number of times for re-transmission can be reduced and much more signaling can be transmitted between the base station and the user terminals in a time unit, and the system throughput capacity and spectrum utilization rate are therefore effectively increased.

Embodiment 2

In this embodiment, the data on the uplink shall be processed and the process of CDD precoding is performed in a user terminal.

Figure 6:
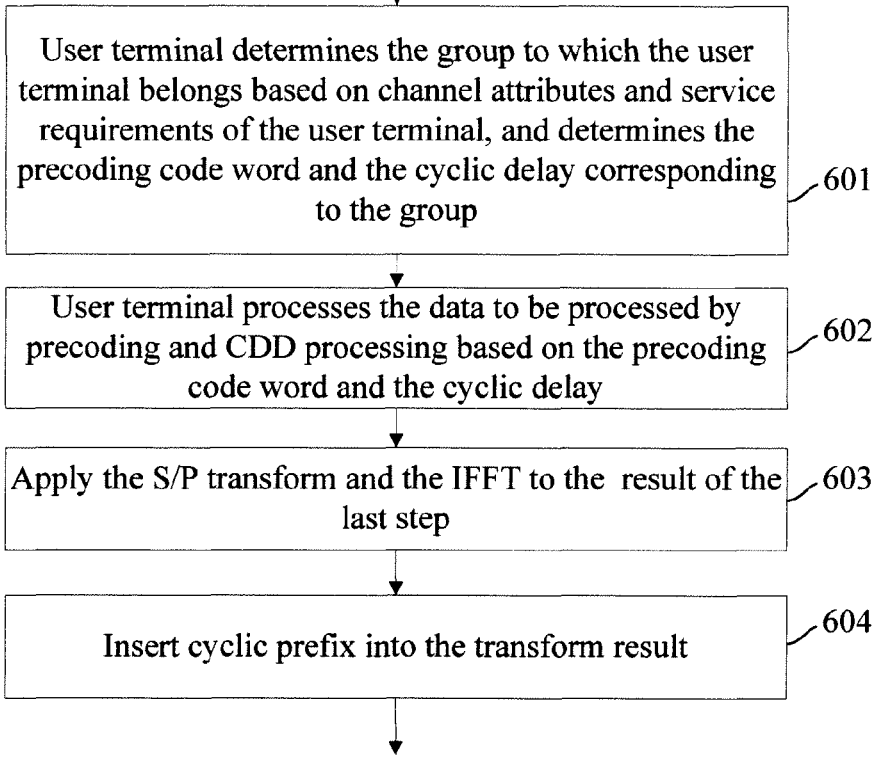
FIG. 6 is a flow chart illustrating a method of data processing in accordance with Embodiment 2 of the present invention.

FIG. 6 is a flow chart illustrating a method of data processing in accordance with Embodiment 2 of the present invention. As shown in FIG. 6, the method of data processing in this embodiment is described below.

In Block 601, a user terminal determines which group it belongs to based on its own channel attributes and service requirements, and determines a precoding code word and a cyclic delay which correspond to the group.

In this embodiment, the user terminals are divided into groups in advance and the group identifiers are saved in the user terminals, a CDD precoding parameter table is created to save the relations of the groups to the cyclic delays as well as the precoding code words. Because the data to be processed is on the uplink, the user terminal determines its own channel attributes and service requirements by measuring its own attribute parameters, and determines which group the user terminal belongs to according to the channel attributes, the service requirements as well as the saved group identifiers. After that, the user terminal searches the CDD precoding parameter table and finds the precoding code word and cyclic delay corresponding to the group.

In this embodiment, the base station and the user terminal may cooperate to determine the group to which the user terminal belongs and the precoding code word and cyclic delay corresponding to the group. Specifically, the base station sets the groups in advance, saves the group identifiers and further sets the CDD precoding parameter table. The user terminal measures its own attribute parameters, e.g. statistic attributes of the channel and movement speed, regularly or when the user terminal has data to be processed; and sends the attribute parameters to the base station. The base station determines the channel attributes and service requirements of the user terminal according to the attribute parameters received from the user terminal. Also the base station assigns the user terminal to a group based on the channel attributes and the service requirements, determines the precoding code word and cyclic delay of the group of the user terminal according to the CDD precoding parameter table. Then the base station sends the determined precoding code word and the cyclic delay to the user terminal. In order to reduce the amount of transmission data in such manner, the same code book and cyclic delay table can be set in both the base station and the user terminal in this embodiment; therefore, the base station only needs to send to the user terminal the precoding code word index and the cyclic delay index instead of the preceding code word and the cyclic delay. The user terminal finds the specified precoding code word and the cyclic delay according to the received indexes.

In Blocks 602-604, the user terminal processes the data to be processed by precoding and CDD processing based on the determined precoding code word and the cyclic delay respectively, then applies the S/P transform and IFFT transform to the result of preceding and CDD processing, and finally inserts a cyclic prefix into the transform result.

Blocks 602-604 are similar to Blocks 403-405 in Embodiment 1. Alternatively, the CDD processing can be preformed after the IFFT transform in this embodiment, and in such a case, the CDD processing is thus applied to time-domain signals.

Now the data processing in this embodiment is completed.

The user terminal now can distribute the data to be transmitted over the transmitting antenna and send the data to the base station on the uplink to complete the transmission of uplink data.

In the two embodiments above, because the user terminals are divided into groups, the CDD precoding can adopt the preceding code word and the cyclic delay that best fit the channel attributes and service requirements of a user terminal in a group. In this way, one can avoid having the data processing adopt uniform precoding code word and cyclic delay not actually matching the demands of user terminals, and thus the signal quality in the MIMO system can be effectively improved.

Figure 7:
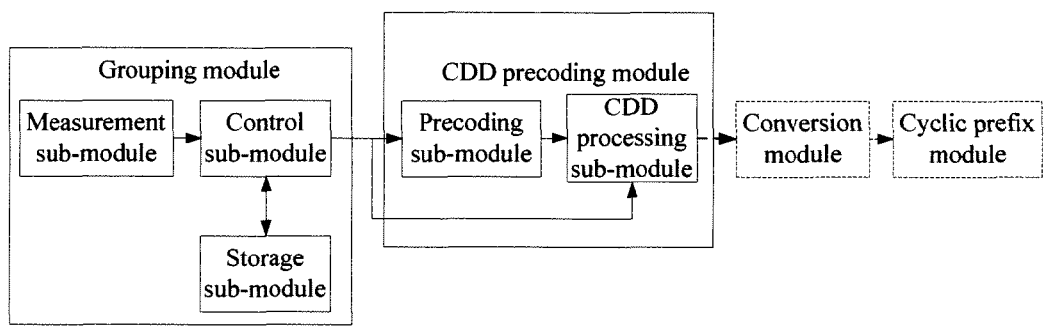
FIG. 7 is a schematic diagram of the structure of a data processing apparatus in accordance with Embodiment 2 of the present invention.

FIG. 7 is a schematic diagram of the structure of a data processing apparatus in accordance with Embodiment 2 of the present invention. As shown in FIG. 7, the grouping module in this embodiment includes a measurement sub-module, a control sub-module and a storage sub-module; and the CDD precoding module includes a precoding sub-module and a CDD processing sub-module. Similar to the data processing apparatus in Embodiment 1, the data processing apparatus in this embodiment may further include a transform module and a cyclic prefix module, both of which are shown with dotted lines in FIG. 7 and perform the same functions as the transform module and the cyclic prefix module in Embodiment 1.

If the user terminal determines the group to which the user terminal belongs to, the measurement sub-module in the grouping module of this embodiment is adapted to measure the attribute parameters of the user terminal and to send the attribute parameters to the control sub-module. The control sub-module is adapted to divide user terminals into groups based on the channel attributes and service requirements of the user terminals, determine preceding code words and cyclic delays corresponding to the groups, and send to the storage sub-module the group identifiers and the relations of the groups to the precoding code words as well as the cyclic delays. The control sub-module is further adapted to receive the attribute parameters from the measurement sub-module, determine which group the user terminal belongs to based on the received attribute parameters; and obtain from the storage sub-module the precoding code word and the cyclic delay corresponding to the group, and send the precoding code word and the cyclic delay to the CDD precoding module. The storage sub-module is adapted to receive from the control sub-module the group identifiers and the relations of the groups to the precoding code words as well as the cyclic delays, save such information and provide the control sub-module with the preceding code word and the cyclic delay corresponding to the group of the user terminal corresponding to the data to be processed. In such a work mode, the other modules and sub-modules in the data processing apparatus function similarly to the corresponding parts in the data processing apparatus in Embodiment 1. Also in such a work mode, the data to be processed in this embodiment is on the uplink and the modules of the data processing apparatus are in the user terminal.

If the base station and the user terminal cooperate to determine the group to which the user terminal belongs, the sub-modules in the grouping module of this embodiment perform the same functions as those modules in the case that the user terminal determines the group to which the user terminal belongs, except that the measurement sub-module in the grouping module, the CDD precoding module, the transform module and the cyclic prefix module are in the user terminal while the control sub-module and the storage sub-module in the grouping module are in the base station.

Figure 8:
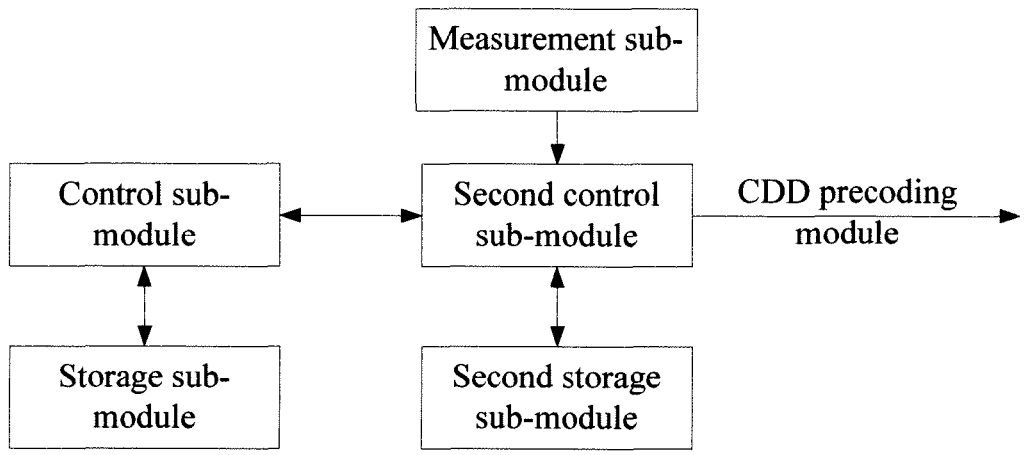
FIG. 8 is a schematic diagram of the structure of a grouping module in accordance with Embodiment 2 of the present invention.

In addition, if the base station and the user terminal cooperate to determine the group to which the user terminal belongs, the grouping module may further include a second control sub-module and a second storage sub-module. FIG. 8 shows the structure of the grouping module in such circumstance. As shown in FIG. 8, the storage sub-module in the base station saves the group identifiers and the relations of the groups to the precoding code word indexes as well as the cyclic delay indexes; the second storage sub-module in the user terminal saves the relations between the precoding code words and the precoding code word indexes, and the relations between the cyclic delays and the cyclic delay indexes. In the data processing, the measurement sub-module in the grouping module divides user terminals into groups based on the channel attributes and service requirements of the user terminals, sets the preceding code words and cyclic delays corresponding to the groups, sends to the storage sub-module the group identifiers and the relations of the groups to the preceding code word indexes as well as the cyclic delay indexes. Further, the measurement sub-module in the grouping module sends to the second control sub-module the relations between the precoding code words and the precoding code word indexes, and the relations between the cyclic delays and the cyclic delay indexes. Further, the measurement sub-module in the grouping module receives the attribute parameters from the measurement sub-module, determines the channel attributes and service requirements of the user terminal based on the received attribute parameters, further determines the group to which the user terminal belongs accordingly. In addition, the measurement sub-module in the grouping module obtains from the storage sub-module the preceding code word index and the cyclic delay index corresponding to the group, and sends the indexes to the second control sub-module. The second control sub-module receives from the control sub-module the relations between the precoding code words and the precoding code word indexes, as well as the relations between the cyclic delays and the cyclic delay indexes; and sends the received relations to the second storage sub-module. The second control sub-module further receives the precoding code word index and the cyclic delay index from the control sub-module, obtains from the second storage sub-module the precoding code word and the cyclic delay corresponding to the received indexes respectively and sends the precoding code word and the cyclic delay to the CDD precoding module.

The data processing and the data processing apparatus in this embodiment can also choose suitable precoding code words and cyclic delays for different user terminals by dividing user terminals into groups, therefore the signal quality is improved and the system throughput capacity and the spectrum utilization rate are increased.

For example, provided the groups are divided in advance based on the movement speed of the user terminals and whether the user terminals have a line-of-sight propagation path from the base station, the user terminals can be divided into groups including high-speed group, low-speed group with line-of-sight propagation and low-speed group without line-of-sight propagation. Regarding the preceding code words and cyclic delays assigned to the groups, the preceding code word and cyclic delay of long-time feedback type are assigned to the high-speed group because the channels of user terminals that move at high speed will change fast and will be unable to provide instant effective feedback; and the precoding code word and cyclic delay of instant feedback type are assigned to the two low-speed groups because the channels of user terminals that move at low speed change only slowly and are traceable. Accordingly, a CDD precoding parameter table is created as shown in Table 1.

TABLE 1

CDD precoding parameter table

| Group | Precoding code word | Cyclic delay |
|---|---|---|
| High-speed group | Precoding code word of long-time feedback type | 16 |
| Low-speed group with line-of-sight propagation | DFT code word | −1 |
| Low-speed group without line-of-sight propagation | DFT code word | 0 |

Provided four pieces of data need to be processed currently, each piece corresponds to one user terminal and all the user terminals are in the same cell. The channel attributes and service requirements of the user terminals are listed as follows:

User Terminal 1, moving at high speed, on the edge of the cell, requiring low bit error rate;

User Terminal 2, moving at low speed, in the center of the cell, on line-of-sight propagation path, no service requirement;

User Terminal 3, moving at low speed, in the center of the cell, no line-of-sight propagation path, no service requirement; and User Terminal 4, moving at low speed, in the center of the cell, no line-of-sight propagation path, no service requirement.

The User Terminal 1 is assigned to the high-speed group, the User Terminal 2 is assigned to the low-speed group with line-of-sight propagation, and the User Terminals 3 and 4 are assigned to the low-speed group without line-of-sight propagation. Then the precoding code words and cyclic delays corresponding to the groups can be found in the CDD precoding parameter table shown in Table 1, and the CDD precoding is applied to the data to be processed for corresponding user terminals based on the found precoding code words and cyclic delays.

As can be seen, the CDD precoding parameters include the precoding code word and the cyclic delay, and the following four situations may emerge concerning the usage of the parameters among the user terminals in the cell after the user terminals are divided into groups and suitable parameters are chosen for the user terminals: first, the user terminals in the cell adopt the same precoding code word and the same cyclic delay; second, the user terminals in the cell adopt the same preceding code word and different cyclic delays; third, the user terminals in the cell adopt different precoding code words and the same cyclic delay; fourth, the user terminals in the cell adopt different precoding code words and different cyclic delays.

The foregoing are only preferred embodiments of the present invention and are not for use in limiting the protection scope thereof. All modifications, equivalent replacements or improvements without departing from the principles of the present invention shall be included in the protection scope of the present invention.

What is claimed is:

1. A method of data processing in a Multiple Input Multiple Output (MIMO) system, comprising:
saving group identifiers in a base station and the user terminals;
dividing user terminals into groups based on channel attributes and service requirements of the user terminals;
setting a precoding code word and a cyclic delay for each of the groups;
determining which group a user terminal corresponding to data to be processed belongs to;
processing the data to be processed by Cyclic Delay Diversity (CDD) precoding based on the precoding code word and the cyclic delay which correspond to the group which the user terminal belongs to; and
wherein said determining which group the user terminal corresponding to the data to be processed belongs to comprises:
measuring, by the user terminal corresponding to the data to be processed, attribute parameters of the user terminal;
determining the channel attributes and the service requirements of the user terminal according to the attribute parameters;

determining which group the user terminal corresponding to the data to be processed belongs to according to the channel attributes, the service requirements and the saved group identifiers; and sending a group identifier of the user terminal to the base station.

2. The method of claim 1, further comprising:

saving a relation of each of the groups to the precoding code word and the cyclic delay in the base station upon setting the precoding code word and the cyclic delay for each of the groups; and searching, by the base station according to the relation, for the precoding code word and the cyclic delay corresponding to the group to which the user terminal corresponding to the data to be processed belongs before processing the data by the CDD precoding.

3. The method of claim 2, further comprising:

sending, by the base station, the found precoding code word and the found cyclic delay to the user terminal upon searching for the precoding code word and the cyclic delay corresponding to the group to which the user terminal corresponding to the data to be processed belongs.

4. The method of claim 2, further comprising:

saving a relation between the precoding code word and a precoding code word index and a relation between the cyclic delay and a cyclic delay index in the base station and the user terminals upon setting the precoding code word and the cyclic delay for each of the groups;

sending, by the base station, a corresponding precoding code word index and a corresponding cyclic delay index to the user terminal upon searching for the precoding code word and the cyclic delay which correspond to the group which the user terminal corresponding to the data to be processed belongs to; and searching, by the user terminal based on the relation between the precoding code word and the precoding code word index and the relation between the cyclic delay and the cyclic delay index, for the precoding code word and the cyclic delay which correspond to the received indexes respectively before processing the data by the CDD precoding.

5. A method of data processing in a Multiple Input Multiple Output (MIMO) system, comprising:

saving group identifiers in a base station;

dividing user terminals into groups based on channel attributes and service requirements of the user terminals;

setting a precoding code word and a cyclic delay for each of the groups;

determining which group a user terminal corresponding to data to be processed belongs to;

processing the data to be processed by Cyclic Delay Diversity (CDD) precoding based on the precoding code word and the cyclic delay which correspond to the group which the user terminal belongs to; and wherein said determining which group the user terminal corresponding to the data to be processed belongs to comprises:

measuring, by the user terminal corresponding to the data to be processed, attribute parameters of the user terminal;

sending, by the user terminal, the attribute parameters to the base station;

determining, by the base station, the channel attributes and the service requirements of the user terminal according to the attribute parameters; and determining, by the base station, which group the user terminal corresponding to the data to be processed belongs to according to the channel attributes, the service requirements and the saved group identifiers.

6. The method of claim 5, further comprising:

saving a relation of each of the groups to the precoding code word and the cyclic delay in the base station upon setting the precoding code word and the cyclic delay for each of the groups; and searching, by the base station according to the relation, for the precoding code word and the cyclic delay corresponding to the group to which the user terminal corresponding to the data to be processed belongs before processing the data by the CDD precoding.

7. The method of claim 6, further comprising:

sending, by the base station, the found precoding code word and the found cyclic delay to the user terminal upon searching for the precoding code word and the cyclic delay corresponding to the group to which the user terminal corresponding to the data to be processed belongs.

8. The method of claim 6, further comprising:

saving a relation between the precoding code word and a precoding code word index and a relation between the cyclic delay and a cyclic delay index in the base station and the user terminals upon setting the precoding code word and the cyclic delay for each of the groups;

sending, by the base station, a corresponding precoding code word index and a corresponding cyclic delay index to the user terminal upon searching for the precoding code word and the cyclic delay which correspond to the group which the user terminal corresponding to the data to be processed belongs to; and searching, by the user terminal based on the relation between the precoding code word and the precoding code word index and the relation between the cyclic delay and the cyclic delay index, for the precoding code word and the cyclic delay which correspond to the received indexes respectively before processing the data by the CDD precoding.

9. A method of data processing in a Multiple Input Multiple Output (MIMO) system, comprising:

saving group identifiers of the groups in the user terminals;

dividing user terminals into groups based on channel attributes and service requirements of the user terminals;

setting a precoding code word and a cyclic delay for each of the groups;

determining which group a user terminal corresponding to data to be processed belongs to;

processing the data to be processed by Cyclic Delay Diversity (CDD) precoding based on the precoding code word and the cyclic delay which correspond to the group which the user terminal belongs to; and wherein said determining which group the user terminal corresponding to the data to be processed belongs to comprises:

measuring, by the user terminal corresponding to the data to be processed, attribute parameters of the user terminal;

determining channel attributes and service requirements of the user terminal according to the attribute parameters; and determining which group the user terminal corresponding to the data to be processed belongs to according to the channel attributes and the service requirements.

10. The method of claim 9, further comprising:
saving a relation of each of the groups to the precoding code word and the cyclic delay in the user terminals upon setting the precoding code word and the cyclic delay for each of the groups; and
searching, by the user terminal based on the relation, for the precoding code word and the cyclic delay which correspond to the group of the user terminal before processing the data by the CDD precoding.

11. A data processing apparatus, comprising:
a processor;
a grouping module, adapted to divide user terminals into groups based on channel attributes and service requirements of the user terminals, set a precoding code word and a cyclic delay for each of the groups, determine which group a user terminal corresponding to the data to be processed belongs to, and cause the data processing apparatus to send the precoding code word and the cyclic delay of the group;
a CDD precoding module, adapted to process the data to be processed by Cyclic Delay Diversity (CDD) precoding based on the precoding code word and the cyclic delay which are received by the data processing apparatus from the grouping module; and
wherein the grouping module comprises: a control sub-module and a storage sub-module;
the control sub-module is adapted to divide the user terminals into groups based on the channel attributes and the service requirements of the user terminals, set the precoding code word and the cyclic delay for each of the groups, and cause the data processing apparatus to send group identifiers and a relation of each of the groups to the precoding code word and the cyclic delay to the storage sub-module of the data processing apparatus; the control sub-module is further adapted to cause the data processing apparatus to receive a group identifier of the user terminal corresponding to the data to be processed from outside of the grouping module, determine the group to which the user terminal belongs, obtain the precoding code word and the cyclic delay corresponding to the group from the storage sub-module, and cause the data processing apparatus to send the precoding code word and the cyclic delay to the CDD precoding module; and
the storage sub-module is adapted to cause the data processing apparatus to receive and save the group identifiers and the relation of each of the groups to the precoding code word and the cyclic delay from the control sub-module, and provide the control sub-module with the precoding code word and the cyclic delay corresponding to the group of the user terminal that corresponds to the data to be processed.

12. The apparatus of claim 11, wherein the grouping module and the CDD precoding module are in a base station.

13. A data processing apparatus, comprising:
a processor;
a grouping module, adapted to divide user terminals into groups based on channel attributes and service requirements of the user terminals, set a precoding code word and a cyclic delay for each of the groups, determine which group a user terminal corresponding to the data to be processed belongs to, and cause the data processing apparatus to send the precoding code word and the cyclic delay of the group;
a CDD precoding module, adapted to process the data to be processed by Cyclic Delay Diversity (CDD) precoding based on the precoding code word and the cyclic delay which are received by the data processing apparatus from the grouping module; and
wherein the grouping module comprises: a control sub-module and a storage sub-module;
the control sub-module is adapted to divide the user terminals into groups based on the channel attributes and the service requirements of the user terminals, set the precoding code word and the cyclic delay for each of the groups, and cause the data processing apparatus to send group identifiers and a relation of each of the groups to the precoding code word and the cyclic delay to the storage sub-module of the data processing apparatus;
the control sub-module is further adapted to cause the data processing apparatus to receive attribute parameters of the user terminal corresponding to the data to be processed, determine the channel attributes and the service requirements of the user terminal and the group to which the user terminal belongs, obtain the precoding code word and the cyclic delay corresponding to the group from the storage sub-module and cause the data processing apparatus to send the precoding code word and the cyclic delay to the CDD precoding module; and
the storage sub-module is adapted to cause the data processing apparatus to receive and save the relation of each of the groups to the precoding code word and the cyclic delay, and provide the control sub-module with the precoding code word and the cyclic delay corresponding to the group of the user terminal that corresponds to the data to be processed.

14. The apparatus of claim 13, wherein the grouping module and the CDD precoding module are in a base station.

15. A data processing apparatus, comprising:
a processor;
a grouping module, adapted to divide user terminals into groups based on channel attributes and service requirements of the user terminals, set a precoding code word and a cyclic delay for each of the groups, determine which group a user terminal corresponding to the data to be processed belongs to, and cause the data processing apparatus to send the precoding code word and the cyclic delay of the group;
a CDD precoding module, adapted to process the data to be processed by Cyclic Delay Diversity (CDD) precoding based on the precoding code word and the cyclic delay which are received by the data processing apparatus from the grouping module; and
wherein the grouping module comprises: a measurement sub-module, a control sub-module and a storage sub-module;
the measurement sub-module is adapted to measure attribute parameters of the user terminal in which the measurement sub-module is located, and cause the data processing apparatus to send the attribute parameters to the control sub-module of the data processing apparatus;
the control sub-module is adapted to divide the user terminals into groups based on the channel attributes and the service requirements of the user terminals, set the precoding code word and the cyclic delay corresponding to each of the groups, and cause the data processing apparatus to send group identifiers and a relation of each of the groups to the precoding code word and the cyclic delay to the storage sub-module of the data processing apparatus; the control sub-module is further adapted to cause the data processing apparatus to receive the attribute parameters from the measurement sub-module, determine the channel attributes and the service requirements of the user terminal based on the attribute parameters received, determine which group the user terminal belongs to, and obtain the precoding code word and the cyclic delay corresponding to the group from the storage sub-module;

the storage sub-module is adapted to cause the data processing apparatus to receive and save the group identifiers and the relation of each of the groups to the precoding code word and the cyclic delay from the control sub-module, and provide the control sub-module with the precoding code word and the cyclic delay corresponding to the group of the user terminal that corresponds to the data to be processed.

16. The apparatus of claim 15, wherein the grouping module and the CDD precoding module are in the user terminal; or the measurement sub-module and the CDD precoding module are in the user terminal, and the control sub-module and the storage sub-module are in a base station.

17. A data processing apparatus, comprising:

a processor;

a grouping module, adapted to divide user terminals into groups based on channel attributes and service requirements of the user terminals, set a precoding code word and a cyclic delay for each of the groups, determine which group a user terminal corresponding to the data to be processed belongs to, and cause the data processing apparatus to send the precoding code word and the cyclic delay of the group;

a CDD precoding module, adapted to process the data to be processed by Cyclic Delay Diversity (CDD) precoding based on the precoding code word and the cyclic delay which are received by the data processing apparatus from the grouping module; and wherein the grouping module comprises: a measurement sub-module, a control sub-module, a storage sub-module, a second control sub-module and a second storage sub-module;

the measurement sub-module is adapted to measure attribute parameters of the user terminal in which the measurement sub-module is located, and cause the data processing apparatus to send the attribute parameters to the control sub-module;

the control sub-module is adapted to divide the user terminals into groups based on the channel attributes and the service requirements of the user terminals, set the precoding code word and the cyclic delay for each of the groups, cause the data processing apparatus to send group identifiers and a relation of each of the groups to a precoding code word index and a cyclic delay index to the storage sub-module of the data processing apparatus, and send a relation between the precoding code word and the precoding code word index and a relation between the cyclic delay and the cyclic delay index to the second control sub-module of the data processing apparatus;

the control sub-module is further adapted to cause the data processing apparatus to receive the attribute parameters from the measurement sub-module, determine the channel attributes and the service requirements of the user terminal according to the attribute parameters received and determine the group to which the user terminal belongs, obtain the precoding code word index and the cyclic delay index corresponding to the group from the storage sub-module and cause the data processing apparatus to send the obtained indexes to the second control sub-module;

the storage sub-module is adapted to cause the data processing apparatus to receive and save the group identifiers and the relation of each of the groups to the precoding code word index and the cyclic delay index from the control sub-module, and provide the control sub-module with the precoding code word index and the cyclic delay index corresponding to the group of the user terminal that corresponds to the data to be processed;

the second control sub-module is adapted to cause the data processing apparatus to receive from the control sub-module the relation between the precoding code word and the precoding code word index and the relation between the cyclic delay and the cyclic delay index; the second control sub-module is further adapted to cause the data processing apparatus to receive from the control sub-module the precoding code word index and the cyclic delay index, obtain the precoding code word and the cyclic delay corresponding to the precoding code word index and the cyclic delay index respectively, and cause the data processing apparatus to send the precoding code word and the cyclic delay to the CDD precoding module; and the second storage sub-module is adapted to save the relation between the precoding code word and the precoding code word index and the relation between the cyclic delay and the cyclic delay index.

18. The apparatus of claim 17, wherein the measurement sub-module, the second control sub-module, the second storage sub-module and the CDD precoding sub-module are in the user terminal; and the control sub-module and the storage sub-module are in a base station.

19. A data processing apparatus, comprising:

a processor;

a grouping module, adapted to divide user terminals into groups based on channel attributes and service requirements of the user terminals, set a precoding code word and a cyclic delay for each of the groups, determine which group a user terminal corresponding to the data to be processed belongs to, and cause the data processing apparatus to send the precoding code word and the cyclic delay of the group;

a CDD precoding module, adapted to process the data to be processed by Cyclic Delay Diversity (CDD) precoding based on the precoding code word and the cyclic delay which are received by the data processing apparatus from the grouping module; and wherein the CDD precoding module comprises: a precoding sub-module and a CDD processing sub-module;

the precoding sub-module is adapted to cause the data processing apparatus to receive the data to be processed, receive the precoding code word from the grouping module, precode the data to be processed with the precoding code word, and cause the data processing apparatus to send a precoding result to the CDD processing sub-module of the data processing apparatus; and the CDD processing sub-module is adapted to cause the data processing apparatus to receive the cyclic delay from the grouping module and the precoding result from the precoding sub-module, and apply CDD processing based on the cyclic delay to the precoding result.

20. The apparatus of claim 19, further comprising:

a transform module, adapted to cause the data processing apparatus to receive a result of the CDD precoding from the CDD processing module and apply Serial/Parallel (SP) transform and Inverse Fast Fourier Transform (IFFT) to the result of the CDD precoding; or adapted to cause the data processing apparatus to receive the precoding result from the precoding sub-module, apply the S/P transform and IFFT to the precoding result and cause the data processing apparatus to send a result of the S/P transform and IFFT to the CDD processing module.

* * * * *